R. T. NEWTON.
BRACKET.
APPLICATION FILED APR. 24, 1919.

1,346,048.

Patented July 6, 1920.
3 SHEETS—SHEET 1.

Inventor
Richard T. Newton
by his Attorneys

R. T. NEWTON.
BRACKET.
APPLICATION FILED APR. 24, 1919.

1,346,048.

Patented July 6, 1920.
3 SHEETS—SHEET 2.

Inventor
RICHARD T. NEWTON
by his Attorneys

R. T. NEWTON.
BRACKET.
APPLICATION FILED APR. 24, 1919.
1,346,048.
Patented July 6, 1920.
3 SHEETS—SHEET 3.
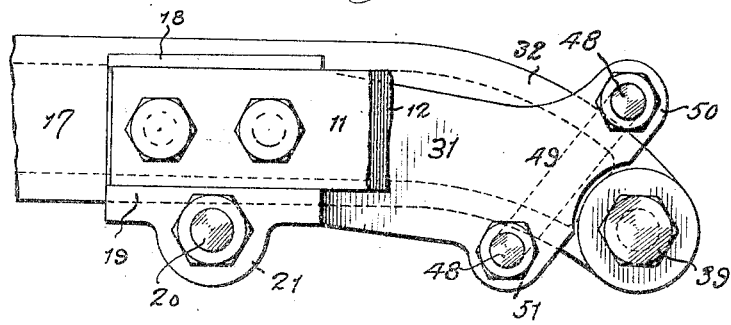
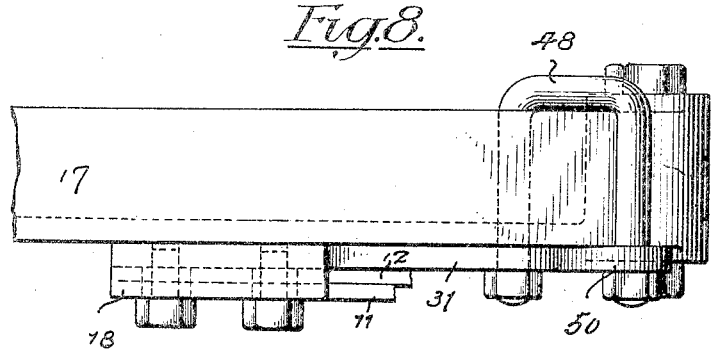
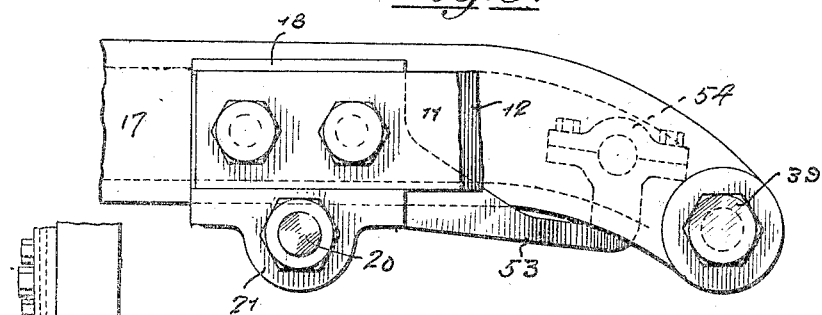
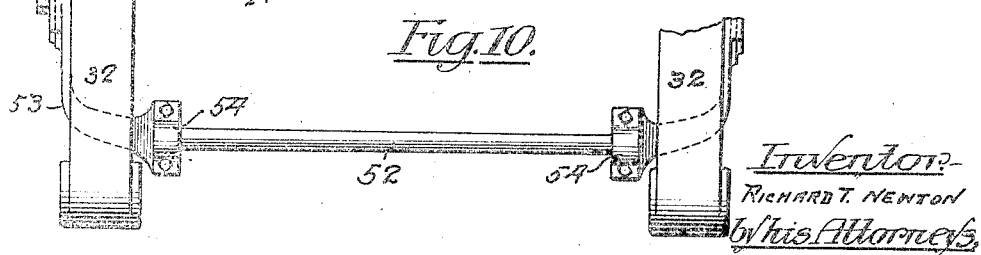

UNITED STATES PATENT OFFICE.

RICHARD T. NEWTON, OF NEW YORK, N. Y.

BRACKET.

1,346,048.  Specification of Letters Patent.  Patented July 6, 1920.

Application filed April 24, 1919. Serial No. 292,474.

*To all whom it may concern:*

Be it known that I, RICHARD T. NEWTON, a citizen of the United States of America, residing in the city, county, and State of New York, have invented certain new and useful Improvements in Brackets, of which the following is a specification.

The present invention relates to brackets, and particularly to brackets for carrying automobile bumpers, the object of my invention being to provide a suitable attachment by which a bumper may be secured to an automobile chassis without injury to the latter, and at the same time affording a rigid support for the attaching end of the bumper. The present application is in part a division of my co-pending application, Serial No. 179,870, filed July 11, 1917, and in part a continuation of it.

Referring to the accompanying drawings—

Figs. 7 and 8 are respectively side elevation and plan of a modified construction;

Figs. 9 and 10 are similar views of another modification.

Figure 1:
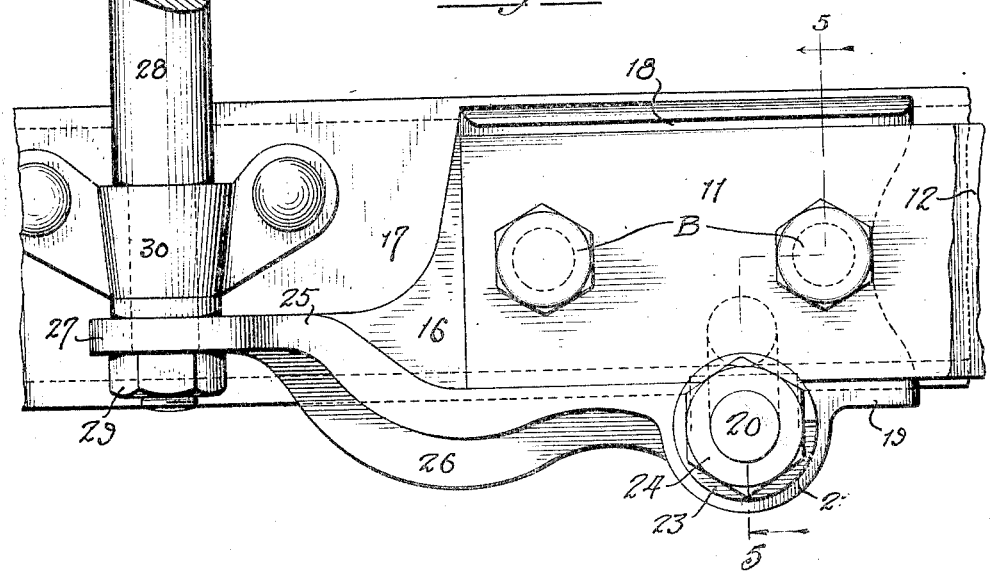
Figure 1 is a side elevation of a bracket in which my invention is embodied in one form.
Figure 2:
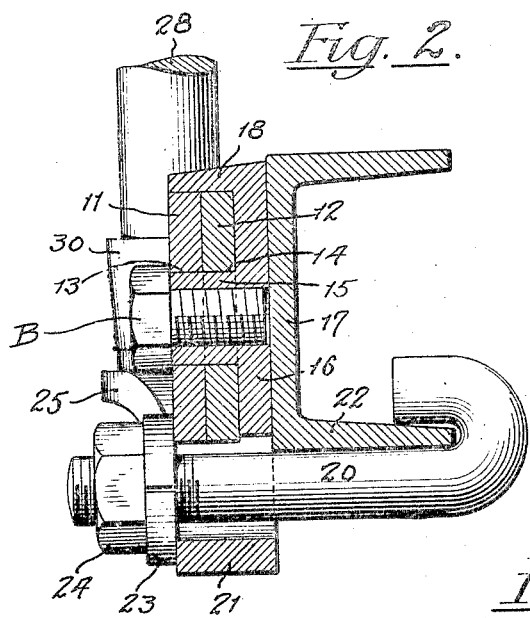
Fig. 2 is a cross section on the line 2—2 of Fig. 1.

The present bracket is particularly designed for the attachment to the automobile chassis of bumpers of the spring strap type illustrated in such prior art patents as those of Hoover or Lyon, in which the impact element of the bumper comprises a strap of spring steel, the opposite ends of which are curved back to the chassis frame, to which they are secured. In the accompanying drawings I have illustrated the attaching ends of a pair of spring straps for a bumper of the improved type shown in my co-pending application, Serial No. 143,815. Referring to the drawings, and particularly to Figs. 1 and 2, the bumper strap ends 11 and 12 are here shown pierced in register at 13 and 14 to fit over studs 15 projecting from the outer face of the securing bracket 16. Bolts B taking into the studs 15 hold the bumper ends rigidly in position on the studs and against the body of the bracket 16. The bracket comprises a body element adapted to lie against the web of the channeled side bar 17 of the chassis and is of a vertical width corresponding substantially to the width of the bumper straps so that the latter fit snugly between the top and bottom flanges 18 and 19, respectively, of the bracket. The bracket is secured to the chassis side bar 17 by means of a hook bolt 20 passing through a downwardly extending ear 21 at the lower margin of the bracket and engaging the lower flange 22 of the chassis side bar. A locking washer 23 is interposed between the nut 24 and the ear 21 and serves to hold the nut tight after the bolt has been drawn up into rigid clamping engagement with the chassis side bar. A second point of attachment to the chassis is provided by a rearwardly extending strut-like arm 25 strengthened by a rib 26 and terminating in a flat web 27 pierced to permit the lower end of the mud guard prop 28 to pass therethrough so that the web may be clamped to the end of the prop by the usual securing nut 29. The prop is supported by a bracket 30 permanently fixed to and thus forming a part of the chassis side bar 17.

A bracket of this type is of particular value in such constructions at the front of the automobile as are now becoming common on many cars, and in which the splash pan for the front of the car is carried entirely across the front of the car and obstructs access to the upper flange of the chassis side bar. It will be noted that the present bumper attachment engages only the lower flange of the chassis side bar, and the member lying on the outer face of the chassis side bar and commonly used in front splash pan and mud guard constructions of the type in question. The bracket may of course be used on cars of other types of front construction, so long as the mud guard prop is present.

Figure 3:
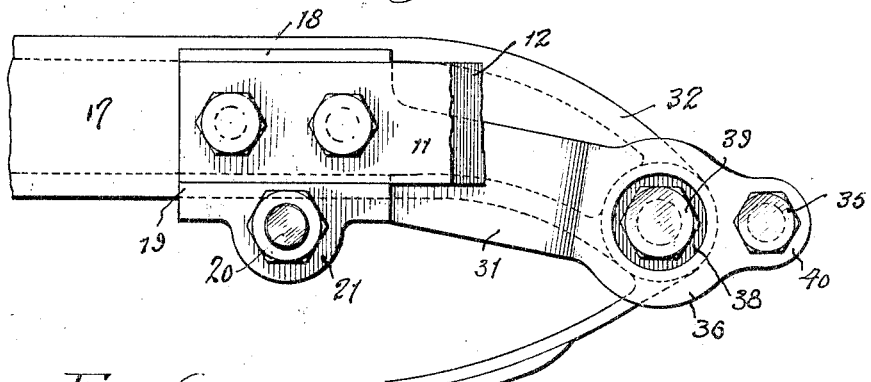
Fig. 3 is a side elevation of a modified bracket construction.
Figure 4:
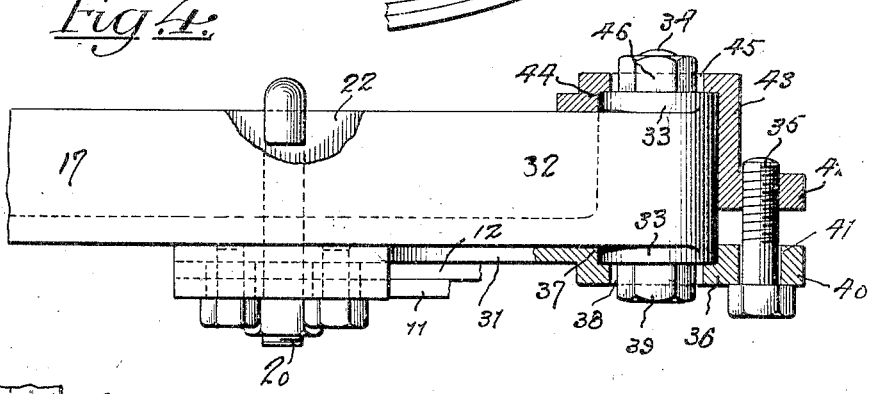
Fig. 4 is a broken plan thereof.

In the construction shown in Figs. 3 and 4 the body of the bracket is of the same general type as that just described, and but a single hook bolt engaging the lower flange of the chassis side bar is utilized. Instead of supporting the body of the bracket by means of a rearward extension engaging the mud guard prop, I have here shown a forwardly extending strut-like arm 31, which is carried to the front of the chassis horn 32 and engaged at the spring bolt head 33 of the latter.

While it is perfectly possible to engage this arm on the spring bolt 34 I prefer not to disturb the installation of the latter, but to carry the end of the arm beyond the end of the chassis horn and clamp it in position by an independent bolt 35. As here shown the end of the arm 31 comprises an enlarged head 36 shouldered at 37 to accommodate the spring bolt head 33 on the chassis horn 32 and apertured at 38 to permit the bolt head 39 to project therethrough. An ear 40 extending beyond the end of the chassis horn is pierced at 41 to permit the bolt 35 to pass therethrough, the screw threaded end of the latter engaging the lug 42 of a coöperating clamping piece 43 overlying the opposite side of the head 33, and similarly shouldered at 44 to accommodate the same and apertured at 45 to clear the nut 46 on the spring bolt 34.

In addition to the fact that this bracket may be installed upon the chassis without any mutilation or weakening of the latter by bolt holes, etc., it has the merit of transmitting the thrust of bumper stress directly to the end of the chassis side bar through the engagement of the spring bolt head 33 by the head 36 of the bracket arm 31. Inasmuch as this is one of the strongest points in the chassis it is obvious that the thrust of the bumper is readily taken care of by this support.

Figure 5:
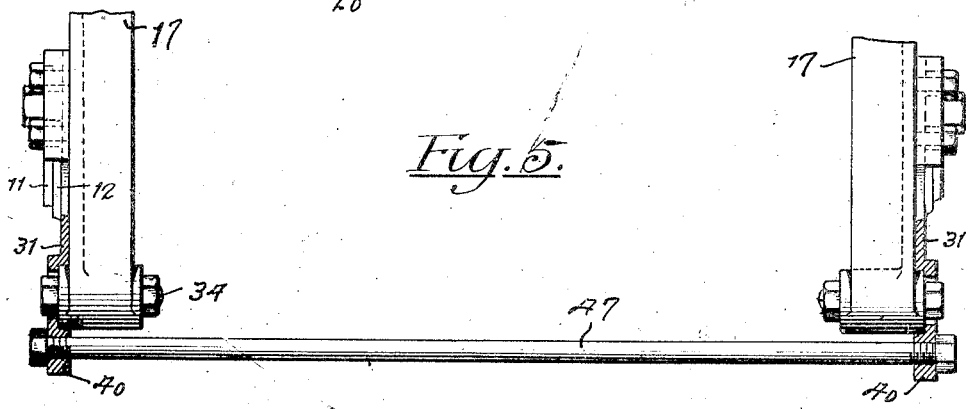
Fig. 5 is a broken plan of a variant of the construction shown in Figs. 3 and 4.
Figure 6:
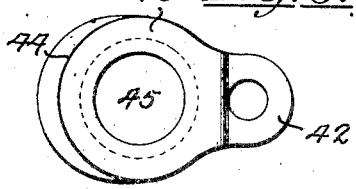
Fig. 6 is a side elevation in detail of the clamp shown in Fig. 4.

In Fig. 5 the construction of the bracket arm 31 and head 36 is identical with that just described, but the clamping element 43 is omitted and the clamping engagement at the head of the chassis horn is secured by a long transverse tie-rod 47, the ends of which pass through the holes in the ears 40. Where a tie-rod of this type is employed the strut bar now used between the ends of the chassis side bars may be dispensed with.

In Figs. 7 and 8 a further modification is illustrated in which, as before, the body of the clamp is substantially the same as that first shown, but the forwardly extending arm 31 is modified in its construction to permit the use of a U-bolt 48 as the front support for the bracket. In this construction the form of the bracket head 49 is extended in opposite directions to afford ears 50 and 51 projecting above and below the chassis horn and pierced to receive the opposite ends of the U-bolt 48. This construction has the advantage that the bracket may be adjusted lengthwise of the horn and the inclination of the bumper varied as may be necessary to bring it into horizontal position.

In Figs. 9 and 10 I have shown the strut bar 52, previously referred to, and extending between the ends of the horn 32. This strut bar affords the front support for the bracket, the forwardly extending arm 53 being carried below and angled across beneath the horn and secured to the bar 52 by means of a clamping plate 54.

Various other modifications of construction will readily occur to those skilled in the art, which do not depart from what I claim as my invention.

I claim:

1. A bumper bracket comprising a bracket body adapted to receive and rigidly engage a bumper end, a draw-up member engaging the bracket and adapted to pass beneath the chassis side bar and engage the lower flange of the latter together with a strut-like bracket extension arm rigid wih the bracket body and engaging a chassis element beyond the end of the bracket body.

2. A bumper bracket comprising a channeled body adapted to receive and rigidly engage a bumper end, a draw-up member engaging the lower portion of the bracket body and adapted to pass beneath the chassis side bar and engage the lower flange of the latter, together with a strut-like bracket extension arm engaging a chassis element beyond the end of the bracket body.

3. A bumper bracket comprising a body adapted to receive and support a bumper end, studs on said body adapted to pass through holes in the bumper end, draw-up means for holding said bumper ends on said studs, a draw-up member adapted to pass beneath the chassis side bar and engage the lower flange of the latter, together with a bracket arm extending beyond the end of the bracket body and pierced to receive a clamping member to secure it to a chassis element.

4. A bumper bracket comprising a bracket body adapted to receive a bumper end, means to secure said end to the said body of the bracket, means passing beneath a chassis side bar and engaging the lower flange thereof for securing the bracket to the chassis, together with an arm extending from the end of the bracket body and engaging a chassis element to transmit the thrust of bumper impact thereto.

5. A bumper bracket comprising a bracket body adapted to engage a bumper end, means engaging the bracket and passing transversely thereof and of the chassis side bar to secure the bracket to the chassis, together with a forwardly extending arm on said bracket body and means for clamping the same to the forward end of the chassis horn to transmit thereto the thrust of bumper impact.

In testimony whereof I have signed my name to this specification.

RICHARD T. NEWTON.